No. 732,391. PATENTED JUNE 30, 1903.
E. B. ALLEN.
POWER TRANSMITTER.
APPLICATION FILED MAY 8, 1902.
NO MODEL.
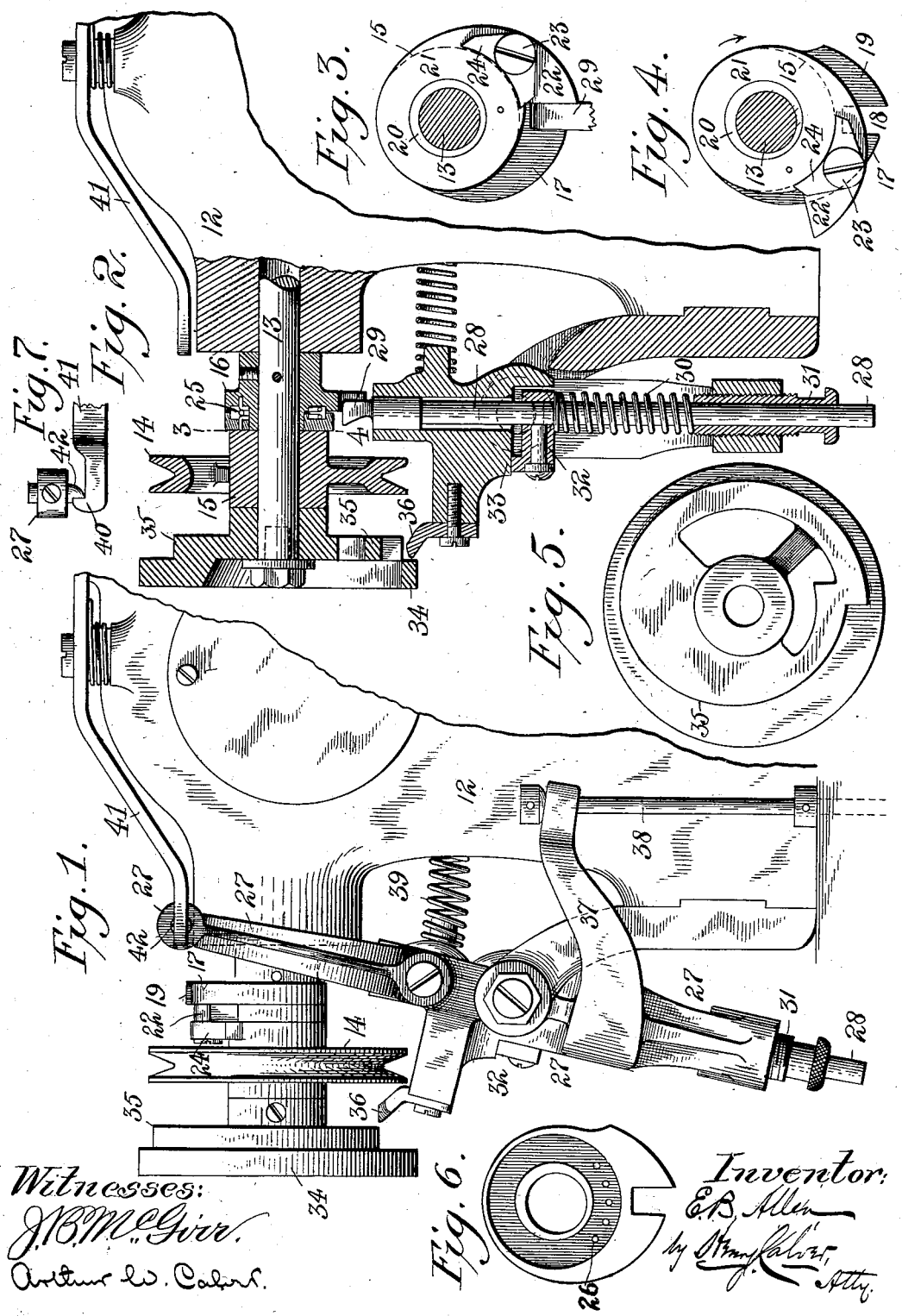

No. 732,391. Patented June 30, 1903.

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

POWER-TRANSMITTER.

SPECIFICATION forming part of Letters Patent No. 732,391, dated June 30, 1903.

Application filed May 8, 1902. Serial No. 106,450. (No model.)

*To all whom it may concern:*

Be it known that I, EDWARD B. ALLEN, a citizen of the United States, residing at Elizabeth, in the county of Union and State of New Jersey, have invented certain new and useful Improvements in Power-Transmitters, of which the following is a specification, reference being had therein to the accompanying drawings.

This invention relates to that class of power-transmitting or stop and start motion devices by means of which a loose driving-pulley may be operatively connected with a driving-shaft by a suitable clutch device or may be disconnected from said shaft when desired; and the invention has for its object to provide a power-transmitter of the class referred to in which the driving-pulley will have a strong frictional clutch connection with the driven shaft when the latter is to be rotated by said pulley and in which the rotation of the driven shaft may be quickly arrested without sudden jar or shock when the clutch connection between the driving-pulley and the shaft is broken.

The invention also comprises a safety device to prevent the clutch-controlling lever from accidentally restoring the clutch connection through any reaction which may occur in breaking the clutch connection to stop the driven shaft.

In the accompanying drawings, Figure 1 illustrates the invention as applied to a sewing-machine and showing the parts in clutched position. Fig. 2 is a vertical sectional view illustrative of the invention and showing the parts in unclutched positions. Figs. 3 and 4 are detail cross-sections on line 3 4, Fig. 2. Fig. 5 is an inside face view of the hand-wheel to show the cam thereon. Fig. 6 is a detail view of the fixed-clutch cam-disk. Fig. 7 is a detail view of the locking device for the clutch-controlling lever.

Referring to the drawings, 12 denotes part of the frame of a machine having a shaft 13, on which is loosely mounted a driving-pulley 14, having a hub 15. Rigidly secured to the shaft 13 is a cam-disk 16, having a cam portion 17, a notch 18, and a stop finger or projection 19 on the side of said notch opposite said cam portion. The hub of the cam-disk 16 comprises an eccentric 20, on which is loosely mounted a tappet ring or disk 21, having a tappet 22, provided with a screw or pin 23, on which is pivotally mounted a radially-movable clutch-shoe 24, so disposed as to overhang or be opposite to the hub 15 of the loose driving-pulley 14. The outline of the hub 15 is partly denoted by dotted lines in Figs. 3 and 4. The adjacent faces of the cam-disk 16 and tappet-disk 21 are recessed for the reception of a torsional spring 25, the opposite ends of which are connected to said disks, and one of said disks is preferably provided with a series of holes 26, into any one of which the ends of said spring may be inserted, said holes providing for a variation or adjustment of the stress of said spring.

Pivotally mounted on the frame 12 or to a suitable bracket fixed thereto is a clutch-controlling lever 27, in which is mounted a sliding rod or plunger 28, having a stopping-finger 29, normally forced outward toward the disks 16 and 21 by a coil-spring 30, encircling said rod or plunger. The stress of said spring 30 may be adjusted by the regulating-screw 31, and the upward movement of the said rod or plunger 28 under the influence of said spring is limited by a block 32, attached to said plunger and abutting against a stopping lug or shoulder 33.

Rigidly attached to the shaft 13 is a hand-wheel 34, provided on its inner face with a cam 35, and the clutch-controlling lever 27 is provided with a safety-finger 36, which when the clutch-lever is moved to the unclutching position (shown in Fig. 2) will be in the vertical plane of the periphery of the cam 35.

The clutch-controlling lever 27 is preferably provided with an arm 37, with which may be connected a treadle-rod 38, to be depressed to move the said clutch-controlling lever to the clutching position, (shown in Fig. 1,) and the said lever will be retained in such position against the stress of the spring 39 by a hook 40 on a holding and tripping lever 41 engaging a pin 42 at the upper end of said clutch-controlling lever.

The operation of the mechanism just described is as follows: When the parts are in the positions shown in Fig. 1 and the finger 29 is removed laterally from the path of movement of the disks 16 and 21, the torsional spring 25 will partially rotate the tappet-disk 21, and such movement of said disk will cause the eccentric 20 to draw the clutch-shoe 24 into biting frictional contact with the hub 15 of the loose pulley 14, so that said pulley and said tappet-disk will become rigid with the cam-disk 16, fixed to the shaft 13, and thus the rotating movement of said pulley will be imparted to said shaft, and as the pulley rotates in the direction denoted by the arrow in Fig. 4 the rotation of said pulley will have a tendency to cause the clutch-shoe to grip the hub of the said pulley tighter, as more duty is imposed on the shaft 13. When the lever 41 is tripped, either automatically or otherwise, to disengage its hook 40 from the pin 42 on the clutch-controlling lever, the spring 39 will force said last-named lever to the position shown in Fig. 2, bringing the finger 29 into the path of rotation of the cam 17 and tappet 22, so that as said cam and tappet rotate they will engage said finger. In such engagement of these parts the rotating tappet strikes the side of the stationary finger 29, thus reversely turning the tappet-disk against the stress of the torsional spring 25 and lifting the clutch-shoe 24 from engagement with the hub of the pulley 14, thereby freeing said pulley. In this reverse turning movement of the tappet-disk the resistance offered by the torsional spring 25 will serve to soften or cushion somewhat the jar or shock which would otherwise occur. In the unclutching operation the cam 17 will ride over the end of the finger 29, forcing said finger downward against the stress of the coil-spring 30, thus offering a cushioning frictional resistance to lessen the jar or shock of suddenly stopping the shaft 13 by slowing up said shaft, and when the said cam passes said finger the latter is forced by the spring 30 into the notch 18 of the cam-disk fixed to the shaft 13, which positively locks the said shaft from further rotating movement, the front face of the stop finger or projection 19, by its contact with the finger 29, serving as a barrier to continued rotation of the said cam-disk 16, fixed to the said shaft 13. When the tappet 22 strikes the stop-finger 29, the sudden reaction has a tendency to overcome the stress of the spring 39, which might accidentally result in restoring the parts to clutching positions; but such accidental improper action is prevented by the guard or safety-finger 36 on the clutch-controlling lever, in coöperation with the cam 35 on the hand-wheel 34, said cam overriding said safety-finger 36 at the time when the tappet 22 strikes the stop-finger 29, so that the concentric part of said cam will securely prevent accidental reactionary displacement of the clutch-controlling lever in the unclutching or stopping operation.

The invention is not to be understood as being limited to the details herein shown, as it is not essential to the invention that the radially-movable clutch-shoe should grip the hub of the loose pulley, as it might engage some other part of said pulley; nor is it essential to the invention that either the part carrying the clutch-shoe or the eccentric controlling said clutch-shoe should be of the particular forms herein shown and described, as an eccentric slot formed in a part fixed to the shaft and operating a radially-movable slide carrying the clutch-shoe would be within the spirit of the invention.

Having thus described my invention, I claim and desire to secure by Letters Patent—

1. In a clutch power-transmitting device, the combination with a shaft to be driven, of a driving-pulley loosely mounted relative to said shaft, an eccentric fixed relative to said shaft, a radially-movable clutch-shoe controlled by said eccentric and serving to operatively connect said loose pulley with said shaft, and clutch-controlling means for engaging and disengaging said shoe and pulley.

2. In a clutch power-transmitting device, the combination with a shaft to be driven, of a driving-pulley loosely mounted relative to said shaft, an eccentric fixed relative to said shaft, a part mounted to turn on said eccentric and provided with a pivoted clutch-shoe serving to operatively connect said loose pulley with said shaft, and clutch-controlling devices for engaging and disengaging said shoe and pulley.

3. In a clutch power-transmitting device, the combination with a shaft to be driven, of a driving-pulley loosely mounted relative to said shaft, a cam-disk fixed to said shaft and provided with an eccentric, a tappet-disk adapted to turn on said eccentric, a spring to turn said tappet-disk on said eccentric, a clutch-shoe to engage a part of said pulley, a clutch-controlling lever, and a spring-pressed sliding rod or plunger having a finger coöperating with the cam of said cam-disk and the tappet of said tappet-disk, to release the said clutch-shoe from said loose pulley, when desired.

4. In a clutch power-transmitting device, the combination with a shaft to be driven, of a driving-pulley loosely mounted relative to said shaft, a cam-disk fixed to said shaft and provided with an eccentric, a tappet-disk adapted to turn on said eccentric, a spring to turn said tappet-disk on said eccentric, a clutch-shoe to engage a part of said pulley, a clutch-controlling lever, a spring-pressed sliding rod or plunger having a finger coöperating with the cam of said cam-disk and the tappet of said tappet-disk, to release the said clutch-shoe from said loose pulley, when desired, and means for holding said clutch-controlling lever in an inoperative position when the said pulley is to be operatively connected with said shaft.

5. In a clutch power-transmitting device, the combination with clutching members, a clutch-controlling lever having a clutch-engaging part, and a spring for operating said lever, of a safety or guard device comprising means for preventing reactionary displacement of the said clutch-controlling lever when the clutching members are disengaged by the said lever under the action of the said spring.

6. In a clutch power-transmitting device, the combination with clutching members, of a clutch-controlling lever provided with a clutch-engaging part, as finger 29, and with a safety projection or finger, as 36, a spring for actuating said clutch-controlling lever, and a cam, as 35, coöperating with said safety-finger to prevent reactionary displacement of said clutch-controlling lever.

In testimony whereof I affix my signature in presence of two witnesses.

EDWARD B. ALLEN.

Witnesses:
 HENRY J. MILLER,
 HENRY A. KORNEMANN.